(12) United States Patent
Aoki et al.

(10) Patent No.: US 7,725,932 B2
(45) Date of Patent: *May 25, 2010

(54) RESTRICTING COMMUNICATION SERVICE

(75) Inventors: Kentaro Aoki, Kanagawa (JP); Yukinobu Moriya, Tokyo (JP); Izumi Kagawa, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/205,247

(22) Filed: Sep. 5, 2008

(65) Prior Publication Data

US 2009/0007254 A1    Jan. 1, 2009

Related U.S. Application Data

(63) Continuation of application No. 11/175,756, filed on Jul. 6, 2005, now Pat. No. 7,474,655.

(30) Foreign Application Priority Data

Sep. 6, 2004    (JP) ............................. 2004-258959

(51) Int. Cl.
G06F 9/00 (2006.01)
G06F 15/16 (2006.01)
G06F 17/00 (2006.01)
G06F 11/00 (2006.01)
G06F 12/14 (2006.01)
G06F 12/16 (2006.01)
G06F 7/04 (2006.01)
G06F 17/30 (2006.01)
G06F 11/30 (2006.01)
G06F 15/173 (2006.01)
G08B 23/00 (2006.01)
H04N 7/16 (2006.01)
H04L 29/06 (2006.01)
B41K 3/38 (2006.01)
H04K 1/00 (2006.01)

(52) U.S. Cl. .............................. 726/14; 726/22; 726/27; 713/151; 713/153; 713/162; 713/188; 380/59; 380/255; 709/200; 709/223; 709/238

(58) Field of Classification Search ..................... 726/2, 726/3, 11–14, 22–24, 26, 27, 29; 713/150–154, 713/162, 188; 380/59, 255; 709/200, 223, 709/225, 238
See application file for complete search history.

(56) References Cited

U.S. PATENT DOCUMENTS 6,874,147 B1    3/2005    Diamant (Continued)

FOREIGN PATENT DOCUMENTS

JP    7-281980 A    10/1995

(Continued)

OTHER PUBLICATIONS

Notice of Allowance from U.S. Appl. No. 11/175,756 dated Sep. 3, 2008.

*Primary Examiner*—Eleni A Shiferaw
*Assistant Examiner*—Oscar A Louie
(74) *Attorney, Agent, or Firm*—Robert Straight; Shimokaji & Associates, P.C

(57) ABSTRACT

In response to a command to start restrictions on a communication service of a computer, the communication service is restricted by a countermeasures apparatus which replaces the communication address of a second computer, which has been stored in a first computer, with the communication address of the countermeasures apparatus, and replaces a communication address of the first computer, which has been stored in the second computer, with the communication address of the countermeasures apparatus. Accordingly, the countermeasures apparatus acquires a packet from the first computer to the second computer and determines whether or not this acquired packet is to be transmitted to the second computer.

3 Claims, 6 Drawing Sheets

U.S. PATENT DOCUMENTS

| | | |
|---|---|---|
| 6,971,044 B2 | 11/2005 | Geng et al. |
| 7,093,288 B1 | 8/2006 | Hydrie et al. |
| 7,174,390 B2 | 2/2007 | Schulter et al. |
| 7,231,430 B2 | 6/2007 | Brownell et al. |
| 7,474,655 B2 * | 1/2009 | Aoki et al. .................. 370/389 |
| 2003/0048783 A1 * | 3/2003 | Tateoka ..................... 370/390 |
| 2004/0088571 A1 * | 5/2004 | Jerrim et al. ................ 713/201 |

FOREIGN PATENT DOCUMENTS

| | | |
|---|---|---|
| JP | 11-136274 A | 5/1999 |
| JP | 2002-318739 A | 10/2002 |
| JP | 2003-348113 A | 5/2003 |
| JP | 2003-273936 | 9/2003 |
| JP | 2003-289338 A | 10/2003 |

* cited by examiner

| TRANSFER PACKET | DISCARD PACKET | EXAMPLE OF EFFECT |
|---|---|---|
| PROTOCOL: HTTP<br>DESTINATION: DISTRIBUTION SITE (DISTRIBUTION SERVER) OF AGENT SOFTWARE | OTHER THAN THE LEFT | USE OF NETWORK CAN BE PREVENTED UNTIL AGENT SOFTWARE IS INSTALLED |
| PROTOCOL: HTTP<br>DESTINATION: UPDATE SITE (DISTRIBUTION SERVER) OF VIRUS DEFINITION FILE | OTHER THAN THE LEFT | DEFINITION FILE CAN BE UPDATED WHILE INFECTED PACKET IS DISCARDED |
| PROTOCOL: HTTP<br>DESTINATION: DISTRIBUTION SITE (DISTRIBUTION SERVER) OF SECURITY PATCH | OTHER THAN THE LEFT | USE OF NETWORK CAN BE PREVENTED UNTIL PATCH IS INSTALLED |
| OTHER THAN THE RIGHT | PORT NUMBER: PORT NUMBER OF PROHIBITED SOFTWARE OR GAME | USE OF NETWORK BY PROHIBITED SOFTWARE OR GAME CAN BE PREVENTED |

FIG. 6

RESTRICTING COMMUNICATION SERVICE

BACKGROUND OF THE INVENTION

The present invention relates to, for example, an apparatus for restricting a communication service. More particularly, the present invention relates to an apparatus and a method for restricting a communication service between computers capable of communicating with a server and the like.

Along with development of network technologies in recent years, a number of computers serving as client terminals have been connected to a network. Accordingly, damages by computer viruses and the like and damages caused by intrusion of hackers and crackers have been increasing. Thus, security measures for the client terminals have been important.

Moreover, execution of prohibited software within a subnetwork by a client terminal can make subnetwork security vulnerable. Meanwhile, sometimes it is wished to use only a specific communication service by a specific computer. For example, for computers of an educational institution and the like, it is preferable that communication services which are not suitable from an educational standpoint can be restricted in computers for students.

In addition, for unregistered computers which are not registered in a server or a resource register (a database stored in the server), elimination of unnecessary connection of the server and the like to a network makes it possible to effectively use network resources.

As described above, for a network administrator and a service provider, it is preferable that communication services of computers connected to the subnetwork (access to the server by computers lacking security measures, use of prohibited software, and the like) can be restricted.

For a computer lacking security measures (computer requiring installation of a virus pattern file or a security patch) (hereinafter referred to as a "computer to be controlled"), it is required that the computer access the server through a LAN (local area network) in order to install the pattern file or the security patch. However, this computer to be controlled lacks security measures. Thus, it is preferable that availability of all usual communication services using the server and the LAN can be restricted from the viewpoint of prevention of virus and worm infection, and the like.

Specifically, for the computer to be controlled, it is desired that it be made possible to execute only a communication service for security measures and to restrict communication services irrelevant to the security measures, such as access to files and use of server applications.

It has been known that such restrictions on a communication service can be realized by providing a firewall (for example, Japanese Published Unexamined Patent Application No. 2003-273936). Specifically, there has been known a method for permitting or restricting a communication service by acquiring a packet between a PC (personal computer) and a server and examining contents of the packet by the firewall. Japanese Published Unexamined Patent Application No. 2003-273936 describes that a packet is filtered by the firewall in performing a communication between a terminal for control and a central server.

Nevertheless, in the method of Japanese Published Unexamined Patent Application No. 2003-273936, if all communications of a computer to be controlled are performed through the firewall, communication services of the computer to be controlled can be restricted. However, when the computer to be controlled is connected inside the subnetwork (such as LAN) in the firewall so that its communication is completed within the network without passing through the firewall, it is not possible to restrict a communication service.

Meanwhile, there has been known a method for restricting a communication service by use of network devices called a layer 3 switch and a layer 7 switch. The layer 3 switch and the layer 7 switch are, for example, switches capable of controlling a destination of a packet by recognizing an application level protocol. Thus, a specific communication service can be restricted by permitting or blocking a communication with a server by acquiring a packet from a computer to be controlled and recognizing this packet.

However, in order to restrict the communication service of the computer to be controlled by use of the layer 3 switch and the layer 7 switch, it is required to use the layer 3 switch and the layer 7 switch for all switches or hubs within a subnetwork. Specifically, all hubs, switches and the like within a subnetwork to which the computer to be controlled may be connected have to be replaced with the layer 3 switch and the layer 7 switch, which are expensive. As another switch, use of an intelligent switch is conceivable. However, this intelligent switch can only block a packet and cannot restrict a communication service.

Furthermore, it is preferable that a communication service can be restricted at an arbitrary timing by an administrator of the subnetwork. For example, even in the case of a computer to be controlled in which security measures are fully implemented once and a communication service is not restricted, when a new virus is circulated, it is preferable that the communication service can be restricted again. It is preferable that restrictions on the communication service can be removed after security measures for the new virus are fully implemented.

As described above, it has been desired that an apparatus or a method capable of restricting a communication service of a computer to be controlled which is connected within a subnetwork through no firewall be provided. In the case of the apparatus or the method, without installation of a number of intelligent switches within the subnetwork, the communication service of the computer to be controlled can be restricted at an arbitrary timing desired by an administrator.

SUMMARY OF THE INVENTION

According to the present invention, provided is a countermeasures apparatus, which is capable of communicating with a plurality of computers including a first computer and a second computer, including: communication address replacing means for replacing a communication address of the second computer, which has been stored in the first computer, with a communication address of the countermeasures apparatus, and for replacing a communication address of the first computer, which has been stored in the second computer, with the communication address of the countermeasures apparatus, in response to a command to start restrictions on a communication service; first packet acquisition means for acquiring a packet from the first computer to the second computer; second packet acquisition means for acquiring a packet from the second computer to the first computer; and first determination means for determining whether or not the packet which the first packet acquisition means has acquired is to be transmitted to the second computer, by which a communication service between the first computer and the second computer is restricted.

According to the present invention, by use of the plurality of computers and the countermeasures apparatus capable of communicating with the first and second computers among the plurality of computers, the communication address replacing means of the countermeasures apparatus, in response to the command to start restrictions on the communication service, replaces the communication address of the second computer, which has been stored in the first computer, with the communication address of the countermeasures apparatus and replaces the communication address of the first computer, which has been stored in the second computer, with the communication address of the countermeasures apparatus. In addition, the first packet acquisition means of the countermeasures apparatus acquires a packet from the first computer to the second computer, and the second packet acquisition means of the countermeasures apparatus acquires a packet from the second computer to the first computer. Moreover, the first determination means of the countermeasures apparatus determines whether or not the packet acquired by the first packet acquisition means is to be transmitted to the second computer. Thus, the communication service between the first and second computers is restricted.

Therefore, according to the present invention, an apparatus or a method can be provided, which are capable of restricting a communication service of a computer to be controlled, the communication service being completed within a subnetwork without passing through a firewall, and which are capable of restricting the communication service of the computer to be controlled at an arbitrary timing desired by an administrator without installation of a number of layer 3 switches and layer 7 switches into the subnetwork.

BRIEF DESCRIPTION OF THE DRAWINGS

For a more complete understanding of the present invention and the advantages thereof, reference is now made to the following description taken in conjunction with the accompanying drawings.

FIG. 6 is a table showing, in the case where a predetermined communication service is restricted, types of packets to be transferred or discarded and effects obtained by restricting the communication service.

DETAILED DESCRIPTION OF THE PREFERRED EMBODIMENT

With reference to the drawings, an embodiment of the present invention will be described below.

Figure 1:
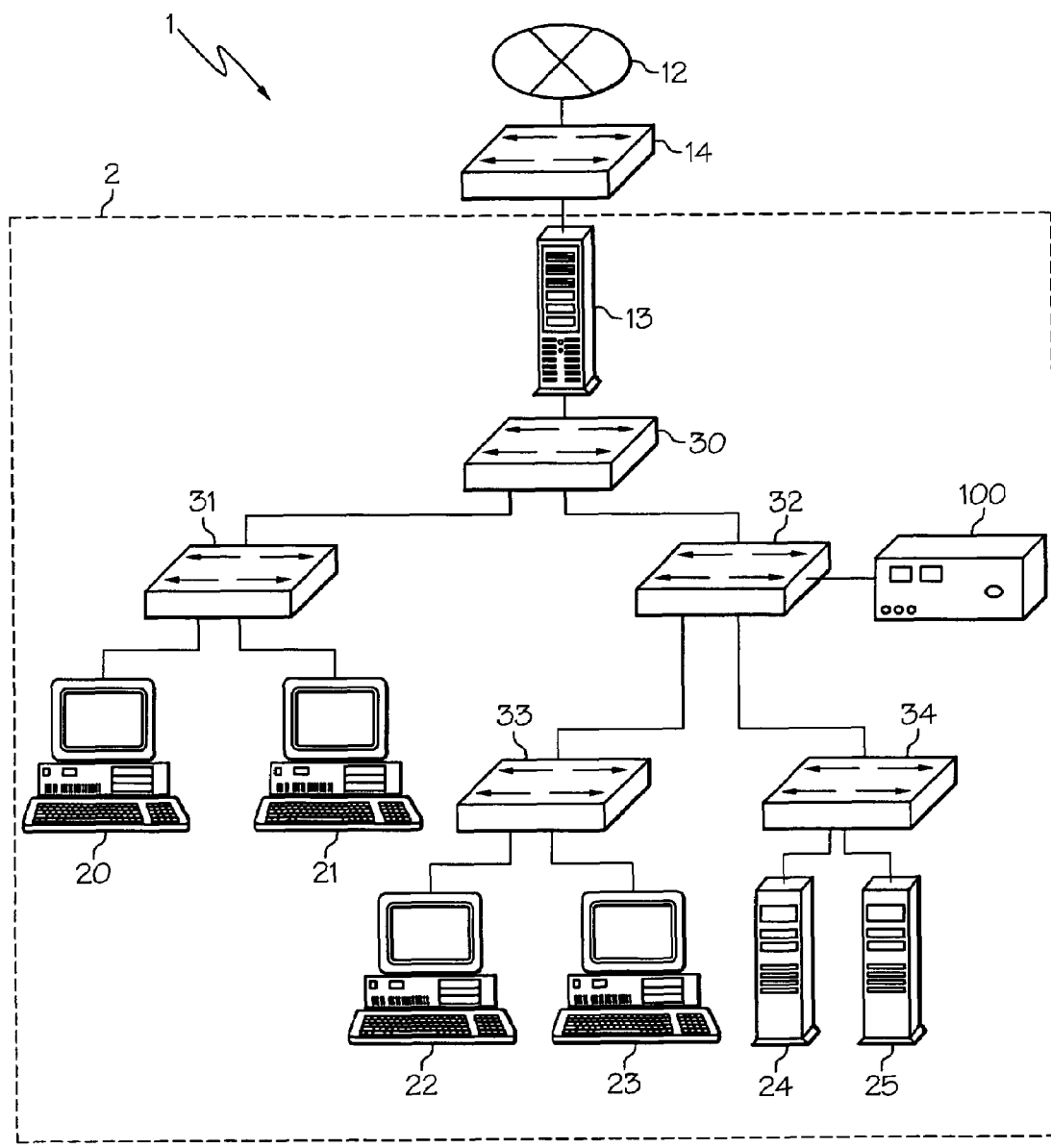
FIG. 1 is a view showing a hardware configuration of a communication service control system according to the present invention.

As shown in FIG. 1, a communication service control system 1 includes: a plurality of computers to be controlled 20 to 23; servers 24 and 25 such as file servers; networking equipments 30 to 34 connected to the computers and the servers; the Internet or an external network 12; a firewall 13 protecting a communication security from the Internet or the external network 12; a router 14; and a countermeasures apparatus 100 for controlling a communication service.

The computers to be controlled 20 to 23 may be personal computers or personal digital assistants (PDAs) as computers of client terminals using this system. Specifically, each of the computers to be controlled 20 to 23 includes: display means such as a CRT display and a liquid crystal display; input means such as a keyboard, a numeric keypad and a mouse; storage means such as a hard disk and a memory; control means such as a CPU; and communication means such as a network card connected to the networking equipments 30 to 34.

The computers to be controlled 20 to 23 are computers (first computers) of which communication services are restricted by the communication service control system 1. Therefore, according to the communication service control system 1, for example, the communication service between the computers to be controlled 20 and 21 may be restricted on condition that the countermeasures apparatus 100 sends out a command to start restrictions on the communication service. Alternatively, the communication service between the computer to be controlled 20 and the server 24 may be restricted. Moreover, a communication service between the computer to be controlled 20 and a server connected through the Internet may be restricted.

The computers to be controlled 20 to 23 may be, for example, computers which lack sufficient measures against viruses or computers which are not permitted to connect to a subnetwork 2. Moreover, the computers to be controlled 20 to 23 may be computers in which prohibited software using an unauthorized communication service is installed. Such computers to be controlled 20 to 23 become a threat to the subnetwork 2. Thus, it is preferable for an administrator of the subnetwork that a predetermined communication service is restricted.

The servers 24 and 25 may be servers such as the file servers and application servers, and are, for example, servers (second computers) which are accessed by the computer to be controlled 20. In the communication service control system 1, communication services between the computers to be controlled 20 to 23 and the servers 24 and 25 are restricted. As described above, not only the communication services between the computer to be controlled 20 and the servers 24 and 25 but also the communication services provided between the computers to be controlled 20 to 23 may be restricted. For example, the communication service between the computer to be controlled 20 (a first computer) and the computer to be controlled 21 (a second computer) may be restricted.

The networking equipments 30 to 34 are devices which relay connections between the computers to be controlled 20 to 23, and may be normal switches, hubs, layer 3 switches and the like. Although the countermeasures apparatus 100 is connected to the networking equipment 32, restrictions on the communication service may be performed for the computers to be controlled 20 and 21 which are connected to the networking equipment 31 which is not directly connected to the countermeasures apparatus 100.

The Internet or the external network 12 is an external network and is, for example, a communication line network through which the servers 24 and 25 being computers to be controlled are accessed from the outside.

The firewall 13 is a computer for restricting communication services accessed by computers through the Internet or the external network 12 and accesses of computers. A network lower than the firewall 13 and the networking equipment 30 is the subnetwork 2 (on the side where the computers to be controlled are connected).

The router 14 is a networking equipment which connects an internal network including the subnetwork 2 and the Internet or the external network 12. The router 14 divides the Internet or the external network 12 from the subnetwork 2.

The countermeasures apparatus 100 is connected to the networking equipment 32 in the subnetwork 2, thereby restricting the communication services between the computers to be controlled 20 to 23 in the subnetwork 2. Specifically, the communication services of the computers to be controlled 22 and 23, which are connected to nodes lower than the networking equipment 32 directly connected to the countermeasures apparatus 100, are restricted. In addition, the countermeasures apparatus 100 restricts the communication services of the computers to be controlled 20 and 21, which are connected through the networking equipments 30 and 31.

Figure 2:
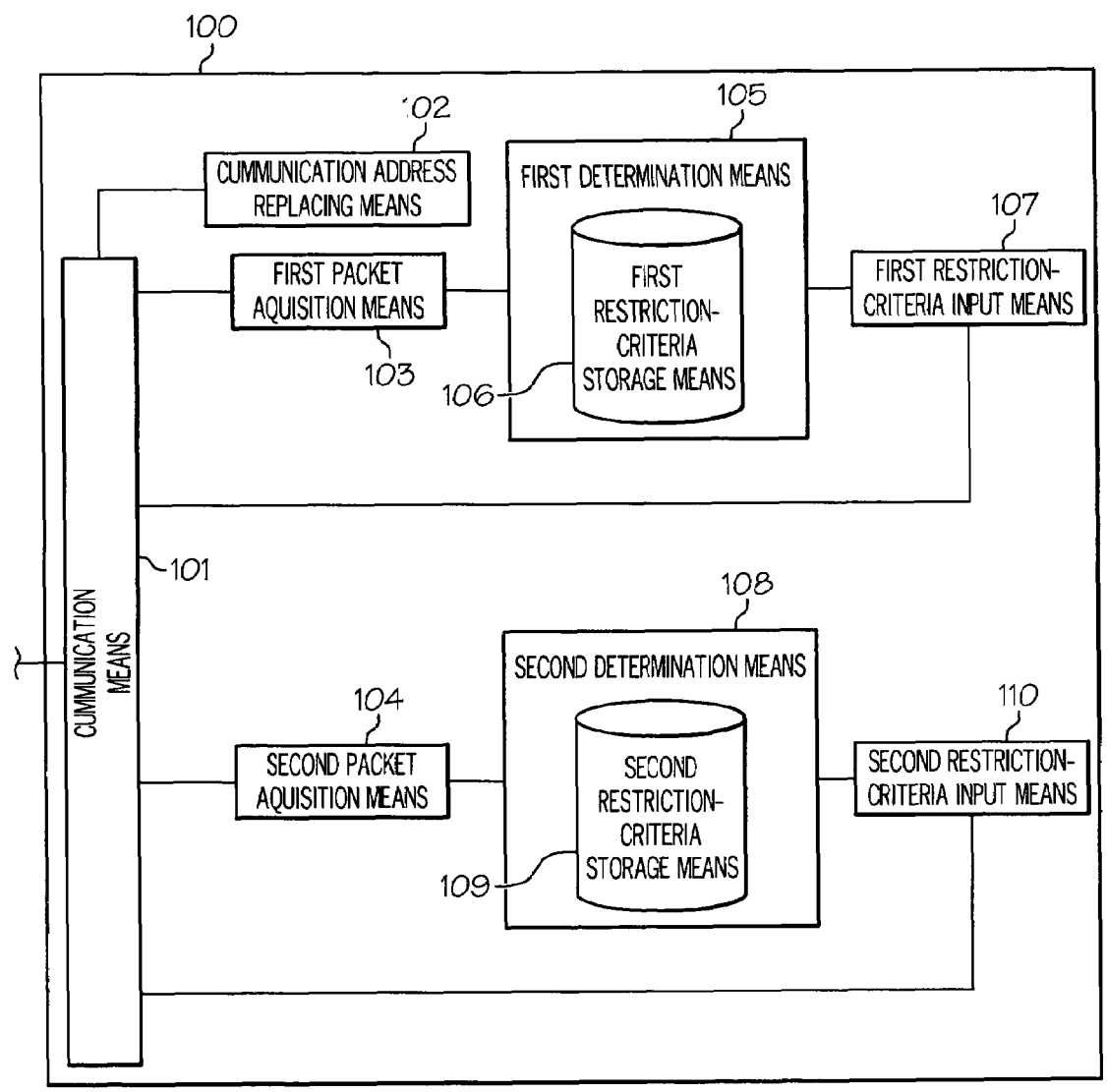
FIG. 2 is a view showing a hardware configuration of a countermeasures apparatus.

The countermeasures apparatus 100 may include (see FIG. 2): communication means 101 for connecting to the networking equipments 30 to 34; communication address replacing means 102 for replacing the communication addresses of the computers to be controlled 20 to 23; first packet acquisition means 103 for acquiring packets of the computers to be controlled 20 to 23, of which the communication addresses are replaced; first determination means 105 for determining whether the acquired packets are to be discarded or to be permitted to pass as is; first restriction-criteria input means 107 for receiving input of criteria for determining whether the packets are discarded or permitted to pass; and first restriction-criteria storage means 106 for storing the determination criteria.

The countermeasures apparatus 100 may further include (see FIG. 2): second packet acquisition means 104 for acquiring packets of the servers 24 and 25 or of the computers to be controlled 20 to 23; second determination means 108 for determining whether the acquired packets are to be discarded or to be permitted to pass as is; second restriction-criteria input means 110 for receiving input of criteria for determining whether the packets are discarded or permitted to pass; and second restriction-criteria storage means 109 for storing the determination criteria.

The communication means 101 is means for connecting to the networking equipments 30 to 34, and may be, for example, a network interface card (hereinafter referred to as a "NIC"). The NIC includes an identification address for identifying the communication means 101, the address being called a MAC (media access control) address.

The communication address replacing means 102 is means for replacing the communication addresses (for example, MAC addresses) of the computers to be controlled 20 to 23 (hereinafter referred to as "first computers"), of which communication services are restricted, with the communication addresses of the servers 24 and 25 (hereinafter referred to as "second computers") which provide the first computers with the communication services.

The communication address replacing means 102 transmits an ARP request or an ARP reply to the first and second computers in response to a command to start restrictions on the communication services, the command being sent out by the administrator of the subnetwork 2. According to the ARP request or the ARP reply, the MAC addresses of the second computers, which have been stored in the first computers, are replaced (overwritten) with a MAC address of the countermeasures apparatus 100, and the MAC addresses of the first computers, which have been stored in the second computers, are replaced (overwritten) with the MAC address of the countermeasures apparatus 100.

The first packet acquisition means 103 is means for acquiring packets or frames which are transmitted from the first computers to the second computers. The communication addresses of the second computers, which have been stored in the first computers, are replaced with the communication address of the countermeasures apparatus 100 by the communication address replacing means 102. Thus, the countermeasures apparatus 100 acquires all of the packets transmitted from the first computers to the second computers. The means hereof for acquiring the packets transmitted from the first computers is the first packet acquisition means 103 (a first packet acquisition step).

The first determination means 105 is means for determining (a first determination step) which packets to be permitted to pass as is (to be transmitted to the second computer) and which packets to be blocked and discarded without being transmitted to the second computer, among the packets acquired by the first packet acquisition means 103.

The first restriction-criteria input means 107 is means for receiving criteria for determining whether the packets are permitted to pass or discarded (a first restriction-criteria input step). Specifically, the administrator inputs data serving as criteria to be used for determinations by first determination means 105. One example of the criteria is that a packet using a communication service of prohibited software is blocked and discarded. The first restriction-criteria input means 107 may be an input device, such as a keyboard and a mouse, which receives input directly from the administrator. Moreover, in the case of receiving input of the criteria through the network, the first restriction-criteria input means 107 receives the data serving as criteria through the communication means 101 and stores the data in the first restriction-criteria storage means 106.

The first restriction-criteria storage means 106 is means for storing the data serving as criteria for determining whether the packets are permitted to pass or discarded (a first restriction-criteria storage step), the data being inputted by the first restriction-criteria input means 107.

The second packet acquisition means 104 is means for acquiring packets or frames which are to be transmitted from the second computers to the first computers. The communication address replacing means 102 has replaced communication addresses of the first computers, which had been stored in the second computers, with the communication address of the countermeasures apparatus 100. Thus, the countermeasures apparatus 100 acquires all of the packets to be transmitted from the second computers to the first computers. This means for acquiring the packets transmitted from the second computers is the second packet acquisition means 104 (a second packet acquisition step).

The second determination means 108 is means for determining which one of the packets acquired by the second packet acquisition means 104 is to be permitted to pass as is (to be transmitted to a first computer) and which one of the packets is to be blocked and discarded without being transmitted to the first computer (a second determination step).

The second restriction-criteria input means 110 is means for receiving criteria for determining whether the packets are permitted to pass or discarded (a second restriction-criteria input step). Specifically, for determination by the second determination means 108, the administrator inputs data serving as criteria for the determination. The second restriction-criteria input means 110 may be an input device, such as a keyboard and a mouse, which receives input directly from the administrator. Moreover, in the case of receiving input of the criteria through the network, the second restriction-criteria input means 110 receives the data serving as the criteria through the communication means 101. and stores the data in the second restriction-criteria storage means 109.

The second restriction-criteria storage means 109 is means for storing the data serving as the criteria for determining whether the packets are permitted to pass or discarded (a second restriction-criteria storage step), the data being inputted by the second restriction-criteria input means 110.

Figure 3:
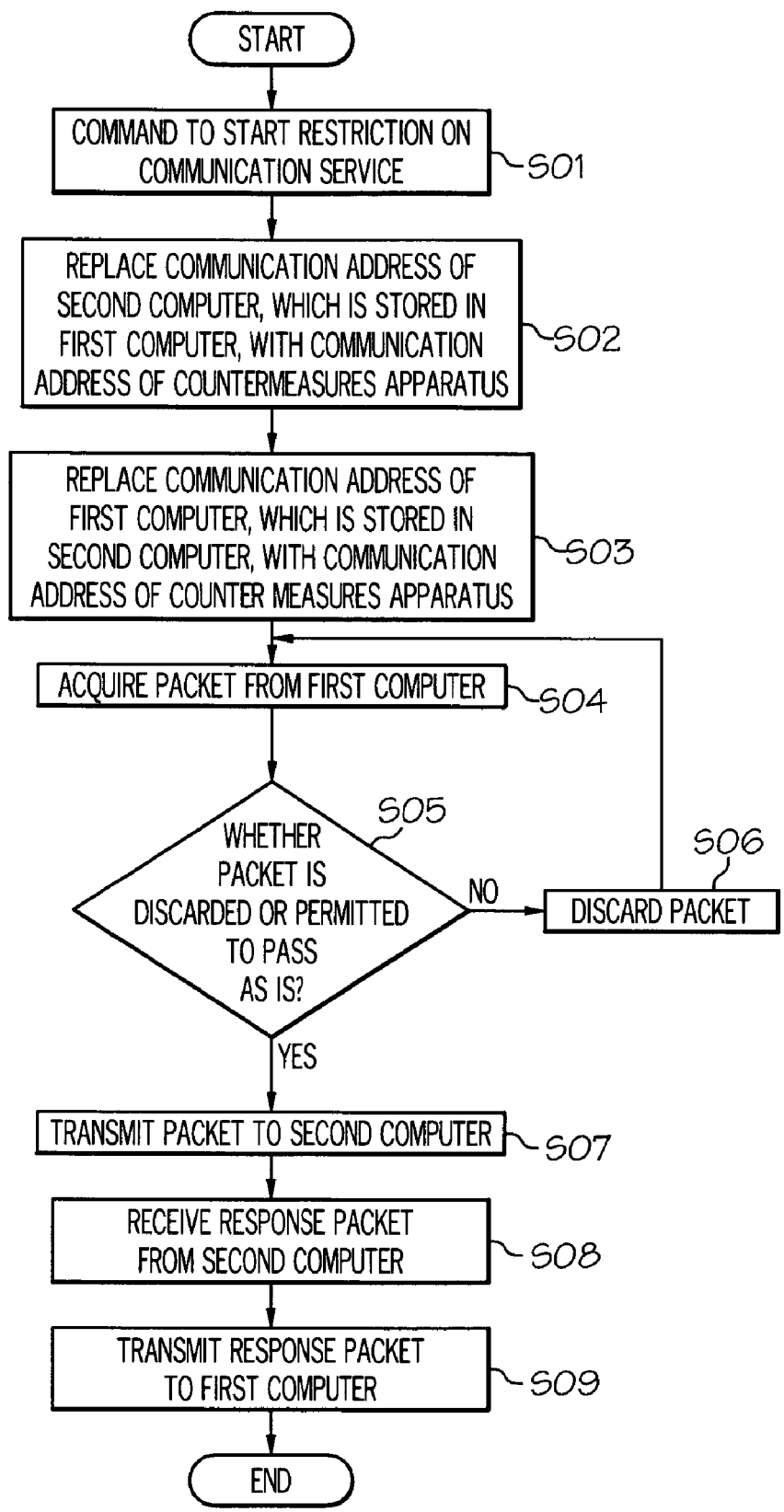
FIG. 3 is a flowchart showing operations executed by respective means of the countermeasures apparatus.

With reference to a flowchart of FIG. 3, description will be given of specific operations executed by the respective means of the countermeasures apparatus 100.

When the administrator wishes to restrict communication services between the computers connected within the subnetwork 2, the administrator sends the countermeasures apparatus 100 a command to start restrictions on the communication services (Step S01). Therefore, the command to start the restrictions on the communication services includes data on computers of which communication services are restricted, contents of the communication services and servers providing the services to the computers.

The restrictions on the communication services may be started not only manually by the administrator but also automatically based on some kind of trigger detected in another system. For example, if there is another system which uses a resource register to detect a network connection of a computer that is not registered in the resource register, the restrictions on the communication services may be started automatically by receiving a command from the system.

In response to the command to start the restrictions on the communication services, the communication address replacing means 102 of the countermeasures apparatus 100 replaces the communication address (MAC address) of the second computer, which has been stored in the first computer (Step S02). Moreover, the communication address replacing means 102 of the countermeasures apparatus 100 replaces the communication address (MAC address) of the first computer, which has been stored in the second computer (Step S03).

Since the communication address of the second computer, which has been stored in the first computer, has been replaced, the first packet acquisition means 103 of the countermeasures apparatus 100 acquires a packet transmitted to the second computer by the first computer (Step S04).

The first determination means 105 determines whether the packet acquired by the first packet acquisition means 103 is permitted to pass as is and transmitted to the second computer or the packet is blocked and discarded (Step S05). The first determination means 105 performs the determination based on criteria data stored in the first restriction-criteria storage means 106. When the first determination means 105 determines that the packet should be blocked and discarded, the first determination means 105 discards the packet (Step S06) and waits for the next packet to be received, with no communication services being performed based on the packet described above.

When the first determination means 105 determines that the packet is permitted to pass, the packet is transmitted to the second computer (Step S07). Meanwhile, the second packet acquisition means 104 of the countermeasures apparatus 100 receives a response packet for the packet described above from the second computer (Step S08) and this received response packet is transmitted to the first computer (Step S09). Thus, a communication service based on the packet described above is implemented from the first computer to the second computer.

Figure 4:
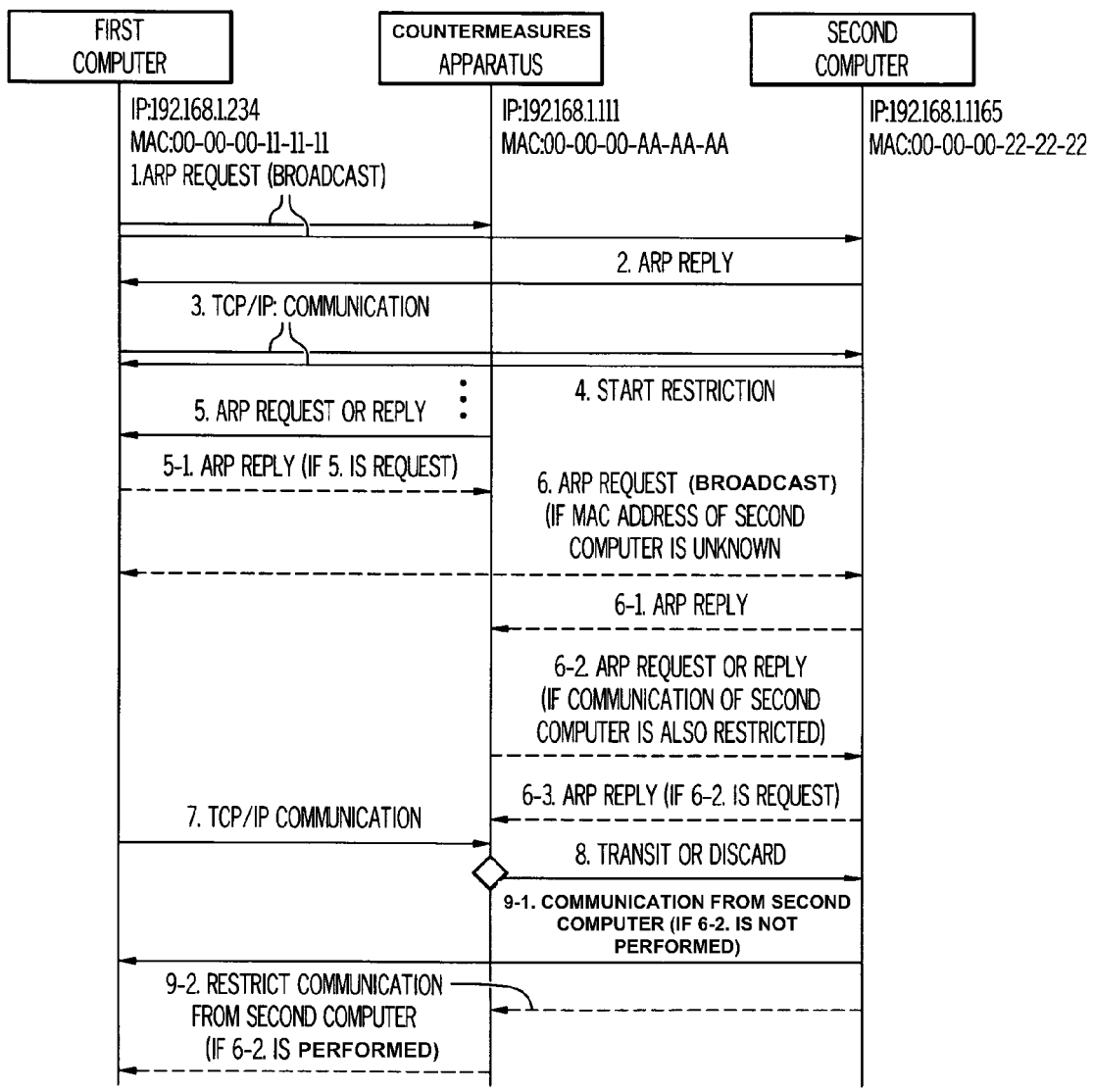
FIG. 4 is a sequence diagram showing a communication sequence performed by a first computer, a second computer and the countermeasures apparatus.

Next, with reference to a sequence diagram (FIG. 4), description will be given of a communication sequence between the first computer, the second computer and the countermeasures apparatus 100.

When the first computer is turned ON or when the first computer is connected to the subnetwork, the first computer transmits an ARP request (1) to all hosts within the same subnetwork (a broadcast communication). Specifically, the first computer uses the ARP request to request the communication address (MAC address) of the second computer.

In response to the ARP request, the second computer transmits an ARP reply (2) to the first computer. Specifically, the MAC address of the second computer is transmitted to the first computer as the ARP reply.

Thereafter, the first computer performs a usual communication, for example, a TCP/IP (transmission control protocol/Internet protocol) communication directly with the second computer.

As described above, the first and second computers may perform the TCP/IP communication (3) after the ARP reply is transmitted from the second computer. Meanwhile, a setting may be made such that a command to start restrictions on a communication service is issued before the TCP/IP communication is performed.

Specifically, when the first computer is turned ON or when the first computer is connected to the subnetwork for the first time, it might not be safe for the subnetwork to immediately connect the first computer to the second computer (for example, a server). In other words, the first computer can be a virus-infected computer or can be a computer lacking a security patch.

Accordingly, a setting may be made such that the next command to start restrictions on the communication service is issued to the countermeasures apparatus 100 immediately after the ARP reply is transmitted from the second computer. As described above, the timing of issuing the command to start restrictions on the communication service may be arbitrarily set by the administrator.

The command to start restrictions on the communication service is issued by the administrator (4). The command is issued at an arbitrary timing for the administrator of the subnetwork in cases, for example, where a new virus is spread and a definition file for the virus needs to be installed, or where a new security patch needs to be installed into an OS (operating system) or the like. Note that the command to start restrictions on the communication service is issued after the ARP reply is transmitted from the second computer.

When the command to start restrictions on the communication service is issued, the communication address replacing means 102 of the countermeasures apparatus 100 transmits an ARP request or an ARP reply to the first and second computers (5). If the first computer receives the ARP request, an ARP reply is transmitted to the countermeasures apparatus 100 (5-1). Based on the ARP request or the ARP reply, the MAC address (00-00-00-22-22-22) of the second computer, which has been stored in the first computer, is replaced with the MAC address (00-00-00-aa-aa-aa) of the communication means 101 of the countermeasures apparatus 100.

Sometimes the MAC address of the second computer is not stored in the countermeasures apparatus 100. In this case, the countermeasures apparatus 100 transmits an ARP request to the second computer (6), and, in response to an ARP reply from the second computer (6-1), acquires and stores the MAC address of the second computer. Since this ARP request is transmitted through the broadcast communication, the ARP request is transmitted to not only the second computer but also the first computer. The MAC address of the second computer is not always acquired upon an inquiry made by the ARP request. For example, if the countermeasures apparatus 100 has stored a frame in which the MAC address of the second computer is stored as a destination or a source, the MAC address may be extracted and acquired from this frame.

As described above, when the MAC address of the second computer, which has been stored in the first computer, is replaced based on the ARP reply, the countermeasures apparatus 100 becomes able to acquire a packet from the first computer to the second computer (7) and becomes able to restrict the communication service of the first computer (8). As a result, if the packet is transferred to the second computer, the second computer communicates with the first computer (9). Accordingly, if the communication service can be sufficiently restricted by discarding the packet from the first computer to the second computer by acquiring a packet from the first computer, there is no need to perform (6-2) and (6-3) in the sequence diagram. In this case, a packet from the second computer is transferred directly to the first computer without passing through the countermeasures apparatus (9-1).

Unlike the case described above, there is a case where the communication service can be restricted by acquiring a packet from the second computer to the first computer and determining the type of this packet by the countermeasures apparatus 100. In this case, (6-2) and (6-3) in the sequence diagram are performed.

The countermeasures apparatus 100 transmits the ARP request or the ARP reply to the second computer. Based on this ARP reply, the MAC address (00-00-00-11-11-11) of the first computer, which has been stored in the second computer, is replaced with the MAC address (00-00-00-aa-aa-aa) of the communication means 101 of the countermeasures apparatus 100. If the countermeasures apparatus 100 transmits the ARP request to the second computer, the ARP reply is transmitted to the countermeasures apparatus 100 (6-3). A packet transmitted from the second computer to the first computer is acquired by the countermeasures apparatus 100. Therefore, the second determination means 108 of the countermeasures apparatus 100 determines the type of this packet, and transfers the packet to the first computer or discards the packet (9-2).

Figure 5:
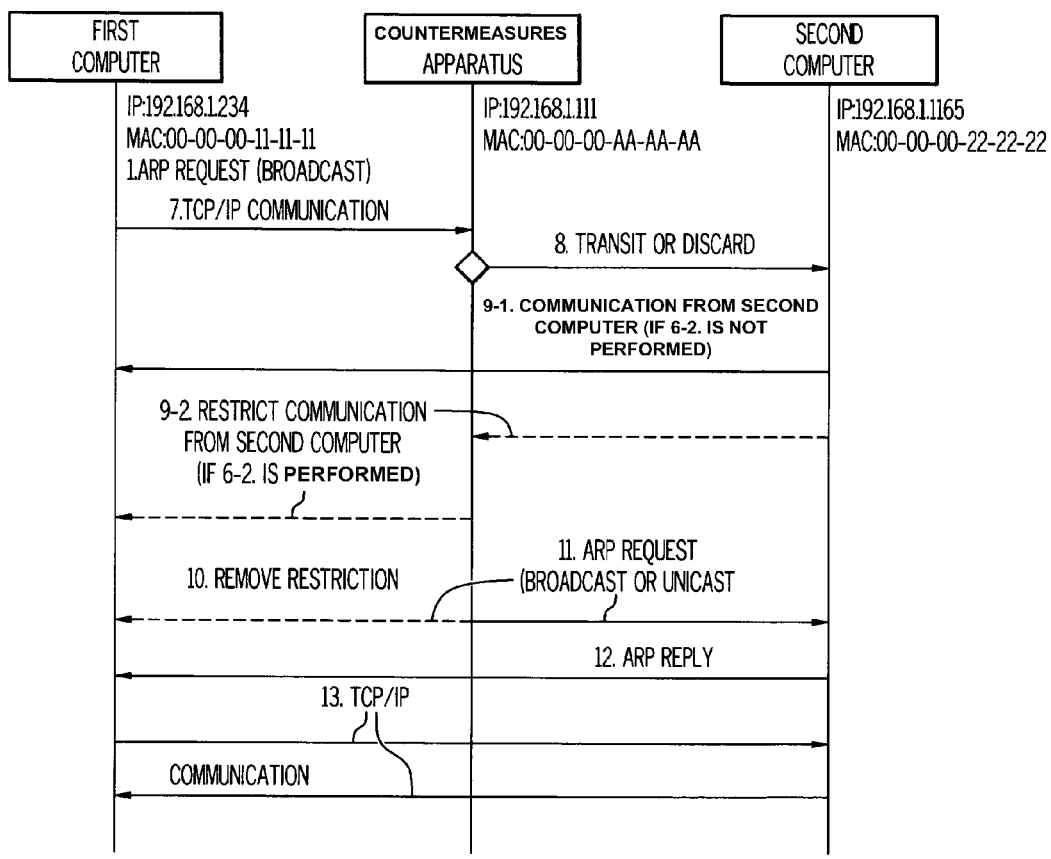
FIG. 5 is a sequence diagram showing a communication sequence performed by the first computer, the second computer and the countermeasures apparatus.

Next, description will be given of a sequence of removing restrictions on a communication service. As a method for removing restrictions, there are two methods including: a method for removing restrictions through a sequence of removing restrictions as shown in FIG. 5; and a method for removing restrictions on a communication service practically by changing transfer conditions of the countermeasures apparatus 100.

In the latter method, the first determination means 105 of the countermeasures apparatus 100 makes a determination so as to transfer all packets to the second computer. Therefore, criteria are inputted from the first restriction-criteria input means 107 so as to transfer all the packets to the second computer. Thereafter, after the communication between the first and second computers has been discontinued for a long time, the MAC address of the countermeasures apparatus 100, which has been stored in the first computer, automatically disappears, and the first and second computers communicate directly with each other not through the countermeasures apparatus 100.

The former method will be described with reference to FIG. 5. Based on a command to remove restrictions (10), an ARP request is transmitted from the countermeasures apparatus 100 to the second computer (11). This ARP request is a request for a MAC address of the second computer. This ARP request is transmitted through a broadcast or unicast communication by using an ARP sender IP address as an IP address of the first computer and by using an ARP sender MAC address as a MAC address of the first computer. However, a source address of a packet is not an address of the first computer. This is because a packet of an ARP reply (12) to the ARP request described above is not delivered to the first computer due to a switch between the first and second computers.

The ARP reply to the ARP request described above is transmitted from the second computer to the first computer (12). At this point, the MAC address of the second computer, which has been stored in the first computer, is rewritten. Specifically, the MAC address of the countermeasures apparatus 100, which has been stored as the MAC address of the second computer, is replaced with the original MAC address of the second computer. Furthermore, the MAC address of the countermeasures apparatus 100, which has been stored in the second computer as the MAC address of the first computer, is replaced with the original MAC address of the first computer.

By replacing the MAC addresses, the first and second computers become able to communicate directly with each other, and removing of the restrictions on the communication service is finished (13).

Usually, in Ethernet (registered trademark), a frame is transmitted to a destination based on a MAC address. Since a plurality of switches existing on a communication pathway store which MAC address exists beyond which port, the frame reaches the destination through these switches. If networking equipments are not switches but hubs, the frame is sent out to all ports. Thus, the frame reaches other hosts as well. However, if a destination does not coincide with a MAC address of its own, this frame is discarded, and only an original destination host receives this frame.

Since the countermeasures apparatus 100 including the MAC address (00-00-00-aa-aa-aa) receives the frame described above, only the countermeasures apparatus acquires a frame transmitted from the first computer, and the second computer does not receive this frame.

As described above, after the MAC addresses have been replaced, all communication packets from the first computer to the second computers are transmitted through the countermeasures apparatus 100. Therefore, the countermeasures apparatus 100 examines each of these communication packets, and determines based on a type of the packet whether the packet is transferred to the second computer or blocked and discarded. Here, the types of the packets are classified according to, for example, a destination IP address of a packet, a port number of a TCT/IP, a protocol, and the like.

When the type of the packet to be transferred or discarded is determined, it is required to specify a communication to be restricted. As the case where the administrator of the subnetwork restricts a communication service for the first computer, for example, the following is conceivable.

There is a case where a computer unapproved to use the subnetwork is prohibited to use a communication service other than to use the communication service for application for the subnetwork use. For a computer which has not yet been registered in the subnetwork, it is preferable, from the viewpoint of security, to permit the computer to use the communication service after application and registration for the subnetwork use are completed. Accordingly, the first determination means 105 should determine whether the packet is transferred or discarded so as to permit only the communication service concerning the application for the subnetwork use and so as to prohibit other communication services.

As an example, there is a case where the first computer applies for the subnetwork use by obtaining agent software through a communication beyond the subnetwork, and by installing and executing the agent software thus obtained. In such a case, whereas a communication service which transmits the agent software through the Internet needs to be provided to the first computer, it is preferable that other communication services irrelevant to the agent software are blocked.

Specifically, a communication address (MAC address) of the router 14, which has been stored in the first computer, is replaced with a communication address of the countermeasures apparatus 100. Thus, a packet from the first computer is acquired by the countermeasures apparatus 100. Consequently, the countermeasures apparatus 100 becomes able to determine the type of the packet, and becomes able to restrict the communication service from the first computer to the second computer.

As a protocol used when the first computer obtains the agent software through the Internet (the communication beyond the subnetwork), an HTTP (hypertext transfer protocol) is used. First, the first computer requests a server on the Internet to transmit the agent software. The first computer transmits a packet using an HTTP protocol requesting the transmission. This packet is addressed to a distribution site of the agent software.

The packet from the first computer is acquired by the countermeasures apparatus 100. The countermeasures apparatus 100 determines whether this packet is a packet for installing the agent software, establishes a connection to the router if the packet is such a packet, and permits a communication. However, packets other than the packet using the HTTP protocol which is addressed to the distribution site described above (packets irrelevant to downloading of the agent software), are prohibited by the countermeasures apparatus 100 from being transferred to the router 14. Thus, the packets are blocked and discarded. The determination of the type of the packet is performed based on data such as types of protocols and addresses of distribution sites.

Meanwhile, there is a case where the first computer applies for the subnetwork use by obtaining agent software not through communication beyond the subnetwork but from a server within the subnetwork, and by executing the agent software. In such a case, only a communication service which receives the agent software from the server is provided to the first computer. In this event, it is preferable that other communication services such as access to files saved in the server are blocked.

As a communication protocol used when the first computer obtains the agent software from the server within the subnetwork, an HTTP (hyper text transfer protocol) is also used. The first computer requests the server to transmit the agent software. Therefore, for example, the countermeasures apparatus 100 may permit the first computer to transfer a packet, which uses the HTTP protocol and is addressed to a distribution server of the agent software, to the second computer (the distribution server of the agent software). However, packets other than this HTTP protocol packet addressed to the distribution server are blocked and discarded so that transfer of the packets to the second computer is prohibited.

The above description is not limited to the case of installation of the agent software, but is considered as applicable to a case of installing a virus definition file, for example. In this case, the countermeasures apparatus 100 permits only a communication service concerning connection to a distribution site of the virus definition file (or a distribution server within the subnetwork) to update the virus definition file, and restricts other communication services. Also in this case, the first computer uses the HTTP protocol and transmits a packet addressed to the distribution site (or the distribution server) of the virus definition file. The first determination means 105 of the countermeasures apparatus 100 determines a type of the packet based on a type of this protocol and destination information, and determines whether the packet is transferred or discarded.

Furthermore, a case of installing a security patch is also conceivable. In this case, the countermeasures apparatus 100 permits only a communication service concerning connection to a distribution site of the security patch (or a distribution server within the subnetwork) to update the security patch, and restricts other communication services. Also in this case, the first computer uses the HTTP protocol and transmits a packet addressed to the distribution site (or the distribution server) of the security patch. The first determination means 105 of the countermeasures apparatus 100 determines a type of the packet based on a type of this protocol and destination information, and determines whether the packet is transferred or discarded.

A command to start restrictions for update of the virus definition file and application of the security patch is issued at an arbitrary timing when the administrator of the subnetwork determines that these measures need to be taken.

In addition, as to prohibited software, a port number of prohibited software, which is transmitted to the second computer by the first computer, may be set as a determination index for the first determination means 105 to determine a packet. Moreover, without being limited to the prohibited software, a port number of a game or an application, of which use is desirable to be controlled, can be set as a determination index for the first determination means 105 to determine a packet.

FIG. 6 is a table showing packets to be transferred or discarded when a communication service is restricted as described above, and effects obtained by restricting the communication service. The communication services to be restricted as described above and the types of the packets to be determination indices are inputted from the first restriction-criteria input means 107. This inputted criteria data may be dynamically corrected and changed.

For example, description will be given of a case where Linux (registered trademark) is used as an OS (operating system) of the countermeasures apparatus 100 and where an iptables command which comes with Linux is used for restricting a communication service. If only an HTTP is permitted to pass from the first computer to the second computer, the administrator receives input of restrictions on this communication service from the first restriction-criteria input means 107 and commands the first destination means 105 to restrict services other than the HTTP service by sending out a command as shown in Expression 1. Here, a number for dport is a well-known port number for TCT/IP. For example, if a packet is one concerning FTP, the number is designated as 21 as shown in Expression 2.

[Formula 1]

$$\text{iptables -A FORWARD -p tcp -dport80 -j ACCEPT} \quad \text{(Expression 1)}$$

$$\text{iptables -A FORWARD -p tcp -dport21 -j ACCEPT} \quad \text{(Expression 2)}$$

A method for controlling a communication service, which realizes the embodiment as described above, can be realized by a program executed by a computer or a server. A storage medium storing this program includes: an optical storage medium such as a DVD, a MD and a PD; a tape medium; a semiconductor memory; and the like. Moreover, the program may be provided through a network by using a storage device being a hard disk, a RAM or the like, which is provided in a server system connected to a dedicated communication network or the Internet, as the storage medium.

Although the embodiment of the present invention has been described above, concrete examples have been merely described, and the present invention is not particularly limited thereto. Moreover, the effects described in the embodiment of the present invention are merely listed as preferred effects achieved by the present invention. The effects of the present invention are not limited to those described in the embodiment of the present invention.

According to the embodiment described above, an apparatus and a method for controlling a communication service and a program executing this method are realized, which will be described in the following items.

(1) A countermeasures apparatus, which is capable of communicating with a plurality of computers including a first computer and a second computer, and which includes: communication address replacing means for replacing the communication address of the second computer, which has been stored in the first computer, with the communication address of the countermeasures apparatus, and for replacing the communication address of the first computer, which has been stored in the second computer, with the communication address of the countermeasures apparatus, in response to a command to start restrictions on a communication service; first packet acquisition means for acquiring a packet from the first computer to the second computer; second packet acquisition means for acquiring a packet from the second computer to the first computer; and first determination means for determining whether or not the packet which the first packet acquisition means has acquired is to be transmitted to the second computer, by which a communication service between the first computer and the second computer is restricted.

(2) The countermeasures apparatus according to (1), further including second determination means for determining whether or not the packet which the second packet acquisition means has acquired is to be transmitted to the first computer.

(3) The countermeasures apparatus according to (1), in which the communication addresses are MAC (media access control) addresses.

(4) The countermeasures apparatus according to (1), in which, since the first computer is a client terminal within a subnetwork and the second computer is a server within the subnetwork, the communication service between the client terminal and the server is restricted.

(5) The countermeasures apparatus according to (3), in which, based on either one of an ARP (address resolution protocol) request and an ARP reply, the communication address replacing means replaces the communication address of the first computer with the communication address of the second computer.

(6) The countermeasures apparatus according to (1), further including: first restriction-criteria input means for receiving input of data on a packet, transmission of which is to be controlled among the packets to be transmitted from the first computer to the second computer; and first restriction-criteria storage means for storing the data on the packet to be controlled, which has been inputted by the first restriction-criteria input means, in which, based on the data on the packet stored in the first restriction-criteria storage means, the first determination means determines whether or not the packet acquired by the first packet acquisition means is to be transmitted to the second computer.

(7) The countermeasures apparatus according to (2), further including: second restriction-criteria input means for receiving input of data on a packet, transmission of which is to be controlled among the packets to be transmitted from the second computer to the first computer; and second restriction-criteria storage means for storing the data on the packet to be controlled, which has been inputted by the second restriction-criteria input means, in which, based on the data on the packet stored in the second restriction-criteria storage means, the second determination means determines whether or not the packet acquired by the second packet acquisition means is to be transmitted to the first computer.

(8) A method for restricting a communication service between a first computer and a second computer, including: a step of replacing the communication address of the second computer, which has been stored in the first computer, with the communication address of the countermeasures apparatus, and for replacing the communication address of the first computer, which has been stored in the second computer, with the communication address of the countermeasures apparatus, in response to a command to start restrictions on the communication service; a first packet acquisition step of acquiring a packet from the first computer to the second computer; a second packet acquisition step of acquiring a packet from the second computer to the first computer; and a first determination step of determining whether or not the packet acquired in the first packet acquisition step is to be transmitted to the second computer.

(9) The method for restricting a communication service according to (8), further including a second determination step of determining whether or not the packet acquired in the second packet acquisition step is to be transmitted to the first computer.

(10) The method for restricting a communication service according to (8), further including a step of acquiring, by the first computer, the communication address of the second computer according to ARP.

(11) The method for restricting a communication service according to (10), in which, in the step of replacing the communication address, the countermeasures apparatus transmits either of an ARP request and an ARP reply to the first and second computers in response to the command to start restrictions on the communication service; the MAC address of the second computer, which has been stored in the first computer, is overwritten with the MAC address of the countermeasures apparatus, thereby replacing the communication address stored in the first computer; and the MAC address of the first computer, which has been stored in the second computer, is overwritten with the MAC address of the countermeasures apparatus, thereby replacing the communication address stored in the second computer.

(12) The method for restricting a communication service according to (8), further including: a first restriction-criteria input step of receiving input of data on a packet, transmission of which is to be controlled among the packets to be transmitted from the first computer to the second computer; and a first restriction-criteria storage step of storing the data on the packet to be controlled, which has been inputted in the first restriction-criteria input step, in which, in the first determination step, it is determined whether or not the packet acquired in the first packet acquisition step is to be transmitted to the second computer, based on the data on the packet stored in the first restriction-criteria storage step.

(13) The method for restricting a communication service according to (9), further including: a first restriction-criteria input step of receiving input of data on a packet, transmission of which is to be controlled among the packets to be transmitted from the first computer to the second computer; and a first restriction-criteria storage step of storing the data on the packet to be controlled, which has been inputted in the first restriction-criteria input step, in which, in the first determination step, it is determined whether or not the packet acquired in the first packet acquisition step is to be transmitted to the second computer, based on the data on the packet stored in the first restriction-criteria storage step.

(14) The method for restricting a communication service according to (10), further including: a first restriction-criteria input step of receiving input of data on a packet, transmission of which is to be controlled among the packets to be transmitted from the first computer to the second computer; and a first restriction-criteria storage step of storing the data on the packet to be controlled, which has been inputted in the first restriction-criteria input step, in which, in the first determination step, it is determined whether or not the packet acquired in the first packet acquisition step is to be transmitted to the second computer, based on the data on the packet stored in the first restriction-criteria storage step.

(15) The method for restricting a communication service according to (11), further including: a first restriction-criteria input step of receiving input of data on a packet, transmission of which is to be controlled among the packets to be transmitted from the first computer to the second computer; and a first restriction-criteria storage step of storing the data on the packet to be controlled, which has been inputted in the first restriction-criteria input step, in which, in the first determination step, it is determined whether or not the packet acquired in the first packet acquisition step is to be transmitted to the second computer, based on the data on the packet stored in the first restriction-criteria storage step.

(16) The method for restricting a communication service according to (9), further including: a second restriction-criteria input step of receiving input of data on a packet, transmission of which is to be controlled among the packets to be transmitted from the second computer to the first computer; and a second restriction-criteria storage step of storing the data on the packet to be controlled, which has been inputted in the second restriction-criteria input step, in which, in the second determination step, it is determined whether or not the packet acquired in the second packet acquisition step is to be transmitted to the first computer, based on the data on the packet stored in the second restriction-criteria storage step.

(17) The method for restricting a communication service according to (13), further including: a second restriction-criteria input step of receiving input of data on a packet, transmission of which is to be controlled among the packets to be transmitted from the second computer to the first computer; and a second restriction-criteria storage step of storing the data on the packet to be controlled, which has been inputted in the second restriction-criteria input step, in which, in the second determination step, it is determined whether or not the packet acquired in the second packet acquisition step is to be transmitted to the first computer, based on the data on the packet stored in the second restriction-criteria storage step.

(18) A computer-readable storage medium storing a program capable of executing the method according to (8).

According to the present invention, an apparatus or a method can be provided, which are capable of restricting a communication service of a computer to be controlled, the communication service being completed within a subnetwork without passing through a firewall, and which are capable of restricting the communication service of the computer to be controlled at an arbitrary timing desired by an administrator without installation of a number of layer 3 switches and layer 7 switches into the subnetwork.

Although the preferred embodiment of the present invention has been described in detail, it should be understood that various changes, substitutions and alternations can be made therein without departing from spirit and scope of the inventions as defined by the appended claims.

The present invention is not only capable of restricting a communication service between computers within a subnetwork but also is applicable to a communication service control system which restricts a communication service between computers connected through the Internet.

What is claimed is:

1. A countermeasure apparatus configured to communicate with a plurality of computers including a first computer and a second computer, comprising:

restriction inputting means for inputting restriction criteria stored in the countermeasure apparatus;

restriction transmitting means for transmitting a set of restrictions including the inputted restriction criteria to the first computer and the second computer;

communication address converting means for converting a communication address of the second computer, stored in the first computer, into a first communication address of the countermeasure apparatus, and for converting a communication address of the first computer, stored in the second computer, into a second communication address of the countermeasure apparatus, in response to a communication restricting service start command;

first packet acquiring means for acquiring a first packet from the first computer to the second computer;

second packet acquiring means for acquiring a second packet from the second computer to the first computer; and first assessing means for assessing whether to send to the second computer the first packet acquired by the first packet acquiring means, to thereby restrict the communication service between the first computer and the second computer;

second assessing means for assessing whether to send to the first computer the second packet acquired by the second packet acquiring means;

wherein the first computer is a client terminal within a subnetwork and the second computer is a server within the subnetwork;

first restriction criteria inputting means for receiving first packet data input with transmission of the first packet data input controlled by third packets sent from the first computer to the second computer; and first restriction criteria storing means for storing first controlling packet data that has been inputted by the first restriction criteria inputting means;

wherein based on the first controlling packet data stored in the first restriction criteria storing means, the first assessing means assesses whether to send to the second computer the first packet acquired by the first packet acquiring means;

second restriction criteria inputting means for receiving second packet data input with transmission of the second packet data input controlled by, fourth packets sent from the second computer to the first computer; and second restriction criteria storing means for storing second controlling packet data that has been inputted by the second restriction criteria inputting means, wherein, based on the second controlling packet data stored in the second restriction criteria storing means, the second assessing means assesses whether to send to the first computer the second packet acquired by the second packet acquiring means.

2. The countermeasure apparatus as set forth in claim 1, wherein a communication address is a media access control address.

3. The countermeasure apparatus as set forth in claim 2, wherein the communication address converting means converts a communication address of the first computer into a communication address of the second computer through an address resolution protocol request and an address resolution protocol reply.

* * * * *